United States Patent

Peterson

[15] 3,663,900

[45] May 16, 1972

[54] VOLTAGE CONTROLLED ATTENUATOR

[72] Inventor: Olav Peterson, Ontario, Canada

[73] Assignee: Northern Electric Company Limited, Montreal, Quebec, Canada

[22] Filed: Feb. 16, 1971

[21] Appl. No.: 115,622

[52] U.S. Cl. ............................333/81 R, 307/257, 307/317, 330/145, 307/237

[51] Int. Cl. ............................H01p 1/22

[58] Field of Search..................307/257, 259, 317, 321, 254, 307/231; 330/145; 333/17, 81 R

[56] References Cited

UNITED STATES PATENTS 3,153,189 10/1964 Sweeney ..............................333/81 X
3,289,120 11/1966 Anders et al.......................307/317 X
3,518,585 6/1970 Wilcox....................................333/81
3,529,266 9/1970 King .......................................333/81

*Primary Examiner*—Donald D. Forrer
*Assistant Examiner*—L. N. Anagnos
*Attorney*—John E. Mowle

[57] ABSTRACT

The circuit controls two direct currents in two PIN diodes of an attenuator so that the product of the two currents is constant. In the circuit, an emitter-fo!'ower controls the direct current in one PIN diode in proportion to a control voltage. The direct current in the other PIN diode is controlled as dictated by the response curve of a transistor, the emitter of which is in series with a diode, in approximate proportion to the reciprocal of the voltage being developed across the one PIN diode. A bridged-T attenuator is thus controllable from a single control voltage source so that it exhibits a constant image impedance over a wide range of insertion loss.

6 Claims, 3 Drawing Figures

INVENTOR
OLAV PETERSON
BY John E Mowle
PATENT AGENT

INVENTOR
OLAV PETERSON
BY John E. Mowle
PATENT AGENT

VOLTAGE CONTROLLED ATTENUATOR

FIELD OF THE INVENTION

The present invention relates to control circuits for controlling the currents in a pair of diode loads in an approximate hyperbolic relationship. More particularly the invention relates to control circuits for controlling the current in a pair of similar diode loads such as those in well known bridge-T and bridge-H attenuators to control the insertion loss in said attenuators.

DISCUSSION OF THE PRIOR ART

Prior examples of electronically controlled attenuators are described in the U.S. Pat. No. 3,153,189 issued Oct. 13, 1964 to H.E. Sweeney and in U.S. Pat. No. 3,289,120 issued Nov. 29, 1966 to J.V. Anders et al. These attenuators are variable through the use of various control circuits which apply a biasing voltage across each diode. As is well known, it is desirable to maintain a constant image impedance at the ports of such attenuators and, of course, this requirement dictates that the product of the impedances of the diodes employed therein is constant.

Anders et al. particularly discloses bridged-T and bridged-H attenuators. As is well explained in the patent to Anders et al, a portion of the forward current conduction characteristic of a diode lends itself to be utilized in the combination of a number of diodes controlled by the simple application of control voltages, such that the direct current flow in one diode will vary approximately in proportion to the reciprocal of the direct current flow in another diode. Such control arrangements work reasonably well over a limited area of diode forward conduction characteristic as explained by Anders et al. Such control means, however, are not sufficiently precise in controlling an attenuator so that it will have a constant image impedance and a variable attenuation range approaching 20 db. The prime cause of this control difficulty is that the diodes can be required to operate, in order to effect a desired attenuation, in regions of their characteristics which fall outside of those characteristics yielding a suitable interplay between the diode currents to maintain the image impedance of the attenuator constant.

In other words the forward current conduction characteristics of the diodes cannot alone be utilized to yield the precise forward current conduction required to operate the diodes in the attenuator over their full impedance ranges while maintaining the image impedance of the attenuator at a precise constant.

Sweeney particularly discloses bridged-T attenuators. The patent to Sweeney describes an alternate method of controlling an attenuator for which particular diodes have been selected so that when said diodes are in a reverse-biased condition they continue to manifest a substantial degree of conductance. This has an obvious advantage in that such an attenuator lends itself well to being controlled by a single voltage source such that during other than zero bias conditions one diode is biased in one direction while the other diode is biased in the other direction. However the use of such diodes imposes a severe compromise upon the circuit designer. For example, a diode having a particular reverse bias leakage curve is utilized to construct an attenuator of a particular image impedance. The image impedance of Sweeney's attenuator is inherently dependent upon the reverse bias conduction curve of the diode. A particular required image impedance dictates the use of a diode having a particular reverse bias conduction characteristic. If a diode of the desired characteristics is not commercially and conveniently available, the required diode must be manufactured or the attenuator cannot be constructed. To the inventor's knowledge no such range of diodes, as would be required to construct attenuators having various required image impedances, is yet commercially available, even though Sweeney's attenuator has been public knowledge for some years.

SUMMARY OF THE INVENTION

A circuit is disclosed for controlling a direct current in each of a pair of diode loads, such as the active diode elements of a bridged-T or bridged-H diode attenuator. The circuit functions such that the product of the diode load direct currents is substantially equal to a constant. The circuit supplies current to one diode load and in response to the resulting voltage thereacross the circuit supplies the other diode load in inverse proportion to said voltage, as dictated by the response characteristic of the base emitter junction of an operating transistor in series aiding with a first diode connected to the emitter of the transistor. A resistor bridges the circuit in order to modify its characteristics to closely maintain the desired current relationship when the direct current in the other diode load is small. A second diode at the junction of the emitter of the transistor and the first diode is biased to conduct and thereby modifies the response characteristic when the direct current in the other diode load is large, to closely maintain the desired current relationship.

Direct currents through a pair of diode loads are controlled by a control circuit such that the product of the two currents is substantially a constant. The control circuit comprises first and second resistors in series between a voltage source and a common terminal with one end of one diode load being connected to the junction between the two resistors. The base of a first transistor is connected to a source of control voltage and the collector is connected to the other end of said one diode load. An emitter resistor is connected between a second voltage source and the emitter of the first transistor so that the first transistor is in series aiding with said one diode load. The base of a second transistor is connected to the junction between the collector of the first transistor and the other end of said one diode load. A first diode is connected between the emitter of the second transistor and the first voltage source so that the second transistor and the first diode are in series aiding with the other diode load which is connected between the common terminal and the collector of the second transistor.

DESCRIPTION OF THE PREFERRED EMBODIMENT

A non-limiting example embodiment incorporating the invention will now be described with reference to the accompanying drawings.

Figure 1:
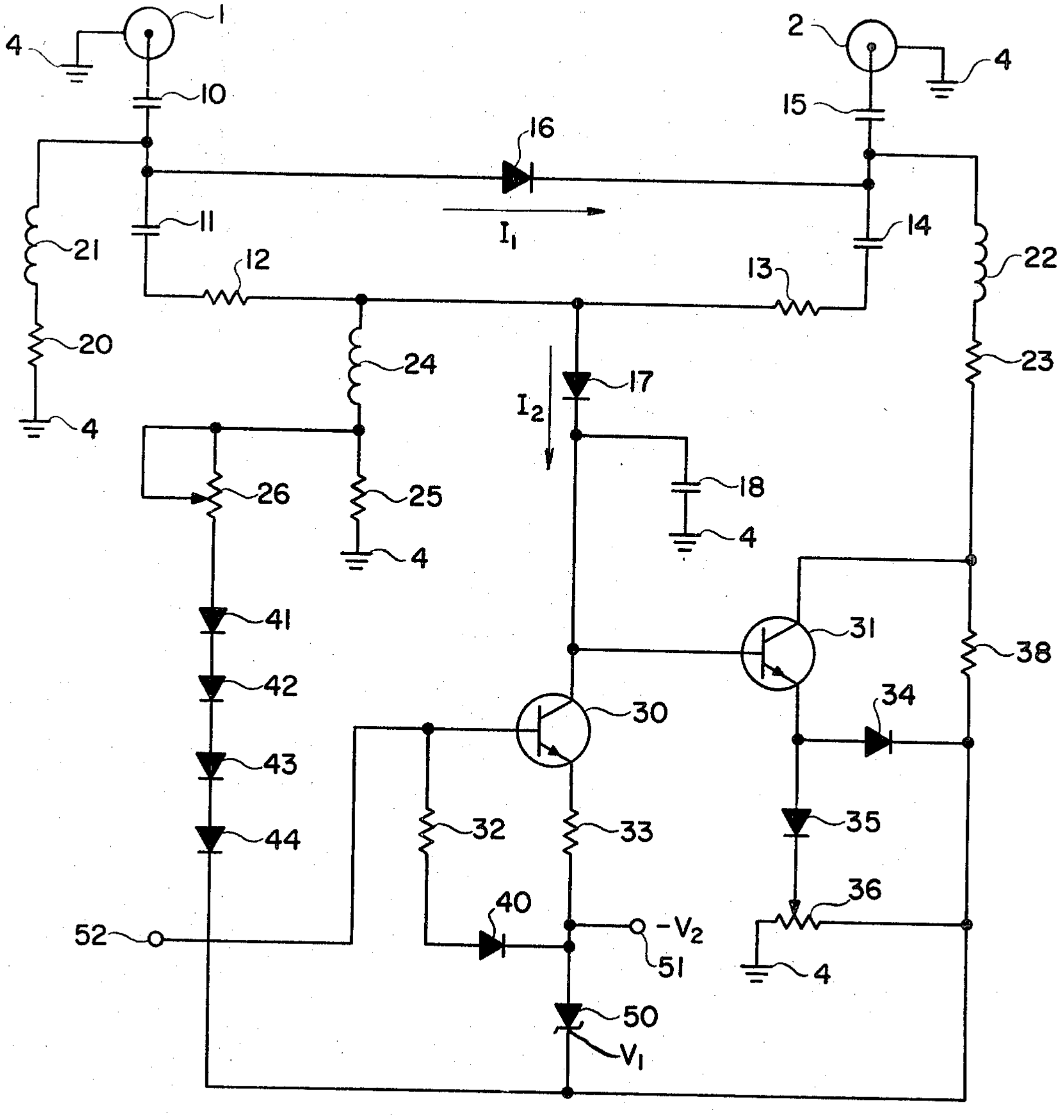
FIG. 1 is a schematic diagram of a control circuit in combination with a well known bridged-T PIN diode alternating current attenuator.

The attenuator and control circuit shown in FIG. 1 comprises a first coaxial port 1 the outer conductor of which is connected to a common terminal 4, a second coaxial port 2 the outer conductor of which is connected to the common terminal 4 and a control terminal 52 for connection to a source of control voltage. Connected in series between the first port 1 and the second port 2, in the order given, are a capacitor 10, a capacitor 11, a resistor 12, a resistor 13, a capacitor 14 and a capacitor 15. A PIN diode 17 is connected in series aiding from the junction of resistors 12 and 13 to the junction of the collector of a transistor 30 and to the base of a transistor 31. A capacitor 18 is connected between the common terminal 4 and the junction between the collector of the transistor 30 and the base of the transistor 31. Connected in series between the common terminal 4 and a voltage terminal 51, in the order given, are a resistor 20, an inductor 21, a PIN diode 16 in series aiding with the voltage terminal 51, an inductor 22, a resistor 23, a resistor 38, and a zener diode 50 in series opposing to the voltage terminal 51. The zener diode 50 thus provides a first voltage source $-V_1$ removed by an amount of the zener voltage from a second voltage source $-V_2$ at the voltage terminal 51. The junction between the inductor 21 and the PIN diode 16 and the junction between the inductor 22 and the PIN diode 16 are connected to the junction between the capacitors 10 and 11 and the junction between the capacitors 14 and 15 respectively. A resistor 25 and an inductor 24 are connected in series between the common terminal 4 and the junction between resistors 12 and 13. A resistor 33 is connected between the emitter of the transistor 30 and the voltage terminal 51. The base of the transistor 30 is connected to the control terminal 52. A resistor 32 and a diode 40 are connected in series between the control terminal 52 and the voltage terminal 51, the diode 40 being in parallel aiding with the emitter of the transistor 30. A diode 34 is connected in series aiding between the emitter of the transistor 31 and the junction of the resistor 38 and the zener diode 50. A potentiometer 36 is connected between the common terminal 4 and the junction of the zener diode 50, the resistor 38 and the diode 34. A diode 35 is connected between the adjustable arm of the potentiometer 36 and the junction of the emitter of the transistor 31 and the diode 34 in series aiding with the emitter of the transistor 31. The collector of the transistor 31 is connected to the junction between the resistor 23 and the resistor 38. A variable resistance 26 is connected in series with a series of four diodes, 41, 42, 43 and 44, between the junction of the inductor 24 and the resistor 25 and the junction of the resistor 38, the diode 34, the potentiometer and the zener diode 50.

Circuit elements 10 through 18 comprise the basic PIN diode attenuator in the well known bridged-T form. With a minor modification two bridged-T attenuators can be used to form the well known bridged-H attenuator. The control circuit, comprising circuit elements 20 through 52, is equally applicable to both types of attenuators and is able to regulate the insertion loss of a diode attenuator while holding the attenuator's image impedance virtually constant at a predetermined value. The control circuit accomplishes this by maintaining a reciprocal relationship between the direct currents through the PIN diodes 16 and 17, that is, when the direct current through the first diode is increased, the direct current through the second diode is decreased and vice versa. In fact, the controlled direct currents through the PIN diodes 16 and 17 substantially follow a rectangular hyperbolic law where the product of the two currents, that is, $I_1$ through the PIN diode 16 and $I_2$ through the PIN diode 17, is equal to a constant, K.

To achieve this relationship of the currents through the PIN diodes 16 and 17, the control circuit in FIG. 1 functions in the following manner. Direct current flow through the PIN diode 17 is determined by the voltage present at the base of the transistor 30 which operates as an emitter-follower and therefore conducts a current sufficient to establish a voltage across the resistor 33 of essentially the same potential as the voltage at the terminal 52. The voltage at the collector of the transistor 30 determines the bias condition of the base-emitter junction of the transistor 31 in series with the diode 34. The PIN diode 16 conducts relatively little current via the resistor 38 when the base emitter junction of the transistor 31 is not sufficiently forward-biased to establish current flow therethrough. This degree of current flow is required in order to maintain the relationship $I_1 I_2 = K$.

When the base emitter junction of the transistor 31 is sufficiently forward-biased to establish a current flow, the collector current of the transistor 31 is drawn from the common terminal 4 through the resistor 20, the inductor 21, the PIN diode 16, the inductor 22 and the resistor 23, thus establishing the direct current flow in the PIN diode 16 at a level substantially determined by the base current and the current gain of the transistor 31. The resistor 25, the variable resistor 26 and the diodes 41, 42, 43 and 44 in combination with the forward voltage drop of the PIN diode 17 determine the voltage present at the collector of the transistor 30. The resistor 25 and the variable resistance 26 in combination establish a relatively constant voltage at their common junction. This voltage varies only slightly with the current flow through the PIN diode 17, as they are of such value that only a small portion of the total current flowing through the resistor 25 is conducted through the PIN diode 17. Therefore any change in direct current flow through the PIN diode 17, determines a change in voltage across the PIN diode 17, which, in sum with the corresponding slight voltage change at the common junction of the resistor 25 and the variable resistor 26, appears as a significant change in voltage at the base of the transistor 31.

The diode 35 is reverse biased by the voltage appearing at the adjustable arm of the potentiometer 36 unless the direct current flow through the PIN diode 17 is relatively little. In order to maintain the relationship $I_1 I_2 = K$, the diode becomes forward biased thereby increasing the slope of the voltage current characteristic at the base of the transistor 31. The resistor 38 and the diode 35 in combination with the potentiometer 36 are not essential to the basic circuit but are included to enhance the control characteristics of the circuit so that when the circuit is used for the control of a bridged-T or bridged-H attenuator a higher degree of return loss than would otherwise be obtainable can be maintained over the range of insertion loss.

Figure 2:
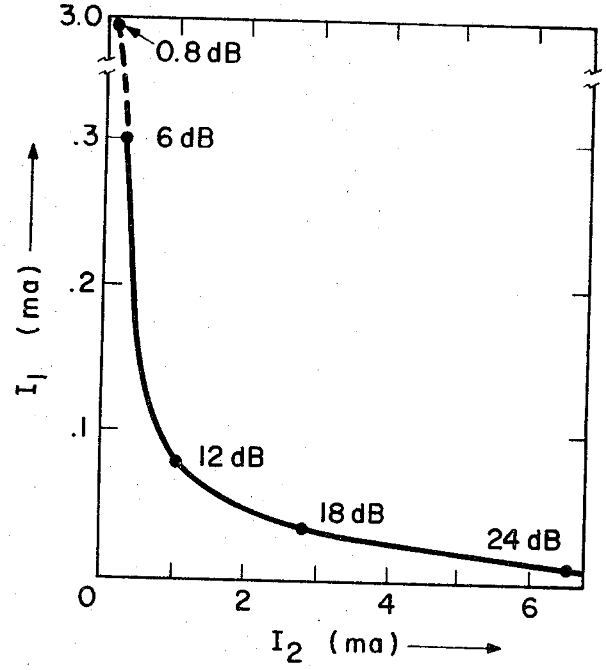
FIG. 2 is a graphical representation of the operating characteristics of the attenuator when controlled by the control circuit as represented by the schematic diagram of FIG. 1.

In FIG. 2 the vertical axis, represents the direct current flow $I_1$ through the diode 16 and the horizontal axis, represents the direct current flow $I_2$ through the PIN diode 17, in milliamps. The resulting curve has been derived by plotting the actual currents measured in the circuit of FIG. 1. This curve is substantially in the form of a hyperbola as is illustrated by the fact that it substantially follows a curve described by the equation $I_1 I_2 = 83 \times 10^{-9}$ where $I_1$ is the current through the PIN diode 16 and $I_2$ is the current through the PIN diode 17, and the constant ($83 \times 10^{-9}$) is that constant which when substantially maintained by the control circuit imparts a characteristic image impedance to the PIN diode attenuator of about 75 ohms. Five different degrees of insertion loss, in decibel units, are located on the curve to show graphically the relationship between $I_1$ and $I_2$ when the circuit is operating at those levels of insertion loss.

The control circuit, comprising circuit elements 20 to 52, functions as graphically illustrated in FIG. 2, to control the level of insertion loss in the bridged-T attenuator comprising circuit elements 10 to 18, in FIG. 1, as follows. When the control voltage at the terminal 52 is decreased, the operating parameters of the circuit in FIG. 1 tend toward the 24 db insertion loss point indicated in FIG. 2. An increased direct current is conducted by the PIN diode 17 via the transistor 30, thereby lowering the AC impedance of the PIN diode 17. The voltage drop between the common terminal 4 and the collector of the transistor 30 becomes greater and thus decreases the bias at the base emitter junction of the transistor 31. Consequently a decreased direct current is conducted by the PIN diode 16 via the transistor 31, thereby raising the AC impedance of the PIN diode 16. In this case the insertion loss between the first port 1 and the second port 2 is increased via the PIN diode 16, while the image impedance at first port 1 and second port 2 is held essentially constant via the decreased AC impedance of the PIN diode 17 in combination with the fixed resistance of the resistors 12 and 13.

When the control voltage at the terminal 52 is increased, the operating parameters of the attenuator in FIG. 1 tend toward its residual insertion loss. The residual insertion loss in this example embodiment is about 0.8 db at about 3 milliamps of direct current in the PIN diode 16 as indicated in FIG. 2. Thus the opposite of the above-described function occurs and thereby the insertion loss between the first port 1 and the second port 2 is decreased while the image impedance is maintained essentially constant.

Figure 3:
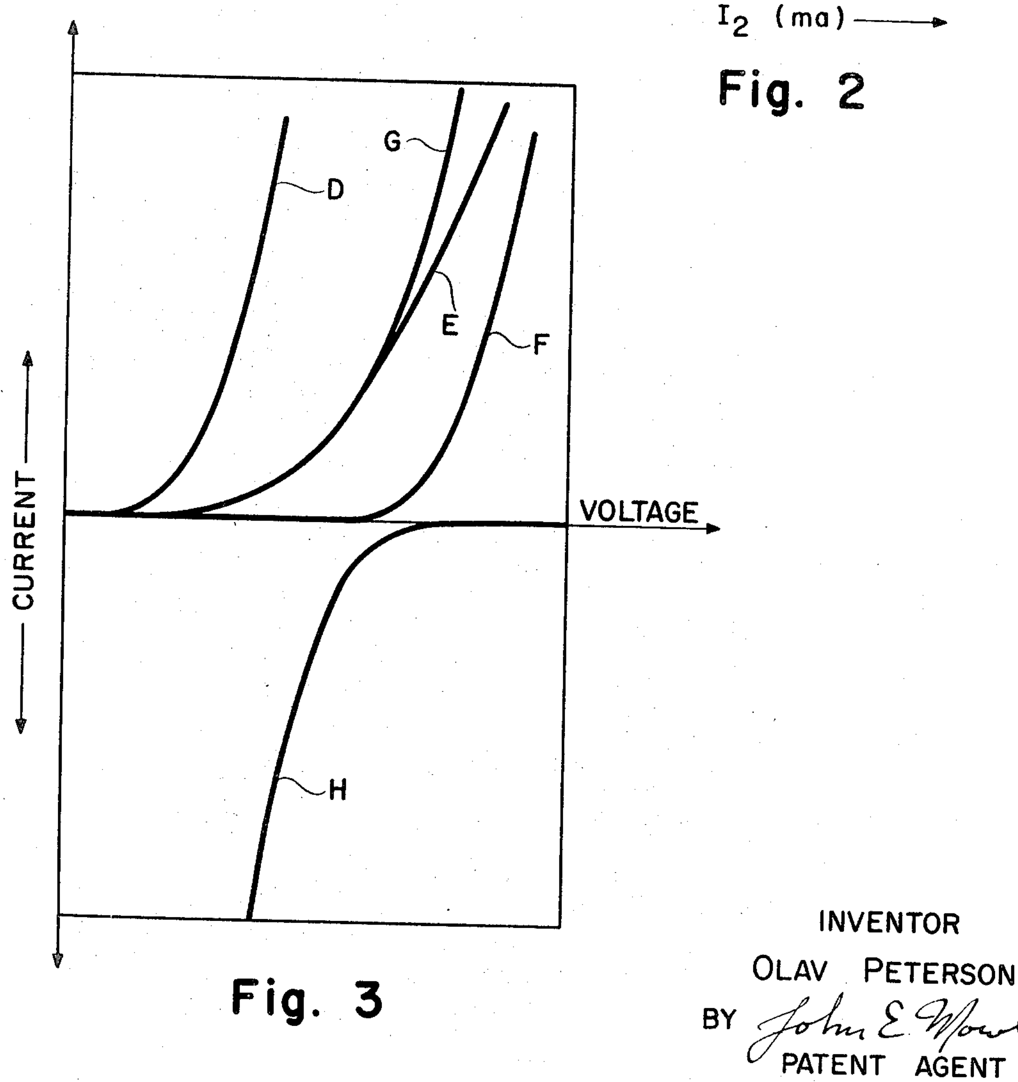
FIG. 3 is a graphical representation of the forward conduction characteristics of various elements and groups of elements in the control circuit of FIG. 1.

The operation of the circuit in FIG. 1 may be more clearly understood with reference to FIG. 3 in which the vertical axis represents current and the horizontal axis represents voltage. A curve D represents the forward current voltage characteristics of the diodes 34 and 35 and the base emitter junction of the transistor 31. A curve E represents the series summation of the forward voltage current characteristics of the diode 34 and the base emitter junction of the transistor 31. A curve F represents the characteristics of the diode 35 in combination with the potentiometer 36. A curve G represents the summation of the curves E and F and defines the current conducted by the PIN diode 16. A curve H illustrates the forward current voltage characteristics of the PIN diode 17. The voltage at which the curve H intersects the zero current level in FIG. 3 is determined predominately by the bias voltage developed at the junction of the resistor 25 and the variable resistor 26. The direct current conducted by the diode 16, represented by the curve G, is that point on the curve G which is vertically opposite that point representing the current being conducted by the diode 17, on the curve H.

The following example involves a description of the more pertinent voltage levels at various points in the circuit. A small direct current conducted by the PIN diode 17, developing a voltage across the PIN diode 17 of 0.6 volts, establishes a forward voltage bias of about 0.8 volts across the base emitter junction of the transistor 31. The transistor 31 in this condition conducts heavily and the PIN diode 16 experiences a heavy forward current. In this case the attenuator tends toward a decrease in insertion loss. If the voltage at the base of the transistor 30 is increased the transistor 30 conducts a greater current thereby increasing the voltage drop across the PIN diode 17 to say, for example, 0.8 volts. This change in voltage appears, in addition to a slight change in voltage at the junction of the resistor 25 and the variable resistor 26, as a voltage reduction at the base of the transistor 31 and thus the base emitter forward voltage drop is reduced to slightly less than 0.6 volts. Correspondingly the base current of the transistor 30 is reduced and consequently the current flow through the transistor 30 is reduced to a relatively low value. The current flow through the PIN diode 16 is thus reduced to a relatively low value, and is partly maintained by current flowing through the resistor 38. In this case the attenuator tends toward an increase in insertion loss.

In the above description of the operation of the example circuit of FIG. 1 the direct currents conducted by the respective PIN diodes 16 and 17 are such that the product of the two currents is essentially equal to a constant. The value of the constant is for the most part determined by the value of the resistor 25 and the adjustment of the variable resistor 26. The resistor 32 and the forward voltage drop of the diode 40 in combination with the effective output impedance of the source of the control voltage, serve to effect slight alterations, inversely with respect to temperature, in the voltage appearing at the base of the transistor 30. Such variations in voltage are necessary to maintain the base current of the transistor 30 substantially constant, thus maintaining the direct current through the PIN diode 17 substantially constant, regardless of temperature variations, for an given setting of the control voltage at the terminal 3.

As has been previously described, the resistor 25 and the variable resistor 26 in combination establish a relatively constant voltage at the junction of these two elements and therefore voltage variations at the base of the transistor 31 are predominately caused by direct current variations in the PIN diode 17. However, the forward voltage drop of the PIN diode 17, the base emitter junction of the transistor 31, the biasing diodes 34 and 35 and the reverse voltage drop of the zener diode 50 vary inversely with respect to temperature. As the current in the PIN diode 17 is maintained substantially constant regardless of temperature, the voltage at the junction of the variable resistor 26 and the resistor 25 must be varied to some degree inversely with respect to temperature so that the voltage appearing at the base of the transistor 31 is such that the base current of the transistor 31 will remain substantially constant regardless of temperature. This inverse variation of voltage with respect to temperature is effected by the series of diodes 41 through 44.

The following list is an example of typical circuit elements which may be used to construct the circuit in FIG. 1.

| | |
|---|---|
| capacitor **10, 11, 14, 15, 18** | 1,000 picofarads |
| resistor **12, 13** | 75 ohms |
| resistor **25** | 270 ohms |
| resistor **20, 23, 33** | 1 kilohm |
| resistor **32** | 2.7 kilohms |
| resistor **38** | 500 kilohms |
| variable resistor **26** | 100 ohms |
| potentiometer **36** | 1 kilohm |
| zener diode **50** | 14.8 volts |
| PIN diodes **16, 17** | Hewlett Packard type 5082—3005 |
| transistors **30, 31** | Motorola MMT type 3904 |
| diode **34** | Motorola MMT type 6050 |
| diode **35** | Hewlett Packard type 2900 |
| diodes **40, 41, 42, 43, 44** | IN 270 |

The inductors 21, 22 and 24 preferably have an impedance of at least 1 kilohm at the lowest frequency for which the attenuator is used.

What is claimed is:

1. A control circuit for controlling direct currents through a pair of diode loads such that the product of the two currents is substantially constant, the control circuit comprising:

first and second resistors in series between a first voltage source and a common terminal, one end of one diode load being connected to the junction between the two resistors, a first transistor having a base connected to a source of control voltage and a collector connected to the other end of said one diode load, an emitter-resistor connected between a second voltage source and the emitter of the first transistor so that the first transistor is in series aiding with said one diode load, a second transistor, having a base connected to the junction between the collector of the first transistor and the other end of said one diode load, the other diode load being connected between the common terminal and the collector of the second transistor, a first diode connected between the emitter of the second transistor and the first voltage source so that the second transistor and the first diode are in series aiding with the other diode load.

2. The control circuit as defined in claim 1, further comprising:

third and fourth resistors in series between the first voltage source and the common terminal, a second diode connected from the emitter of the second transistor to the junction of the third and fourth resistors so that the other diode load, the second transistor and the second diode are in series aiding, a fifth resistor connected between the first voltage source and the collector of the second transistor.

3. A control circuit as defined in claim 2 further comprising:

a plurality of diodes inserted in series aiding between the first voltage source and the first resistor, a sixth resistor and a third diode connected in series between the second voltage source and the base of the first transistor, the third diode being so connected that it is in parallel aiding with the base emitter junction of the first transistor and the sixth resistor being about twice the value of the output impedance of the source of the control voltage.

4. The control circuit as defined in claim 1 for controlling the insertion loss of a bridged-T diode attenuator in which the diode loads are the diode elements of the attenuator.

5. The control circuit as defined in claim 2 for controlling the insertion loss of a bridged-T diode attenuator in which the diode loads are the diode elements of the attenuator.

6. The control circuit as defined in claim 3 for controlling the insertion loss of a bridged-T diode attenuator in which the diode loads are the diode elements of the attenuator.

* * * * *